United States Patent [19]

McGuire

[11] 4,351,682

[45] Sep. 28, 1982

[54] FLEXIBLE DUCT FORMING APPARATUS AND METHOD

[75] Inventor: Hugh K. McGuire, North Hollywood, Calif.

[73] Assignee: CASCO Inc., San Fernando, Calif.

[21] Appl. No.: 161,425

[22] Filed: Jun. 20, 1980

[51] Int. Cl.³ .............................................. B65H 81/00
[52] U.S. Cl. ..................................... 156/143; 156/125; 156/429
[58] Field of Search ............... 156/143, 144, 195, 171, 156/429, 428, 446, 425, 456, 505

[56] References Cited

U.S. PATENT DOCUMENTS

| | | | |
|---|---|---|---|
| 2,713,381 | 7/1955 | Seck | 156/143 |
| 3,336,172 | 8/1967 | Hall et al. | 156/429 |
| 3,962,019 | 6/1976 | Rejeski | 156/429 |

Primary Examiner—Michael W. Ball
Attorney, Agent, or Firm—David O'Reilly

[57] ABSTRACT

A flexible duct forming apparatus and method in which flexible strip material is wrapped on a rotating mandrel in a helical path, with the edges of the flexible strip material overlapping a pre-determined amount. Reinforcing wire is formed into a helix of substantially constant diameter and pitch and guided by a fixed helical means between the overlapping edges of the flexible strip material. The overlapping edges of the flexible strip material is then pressed around the reinforcing wire to seal and encapsulate the wire to continuously form flexible duct. The reinforcing wire is formed into the substantially constant helix by a fixed helical means which is interchangeably mounted on a base as is the mandrel, so that the apparatus can be used to manufacture different diameter flexible ducting.

78 Claims, 15 Drawing Figures

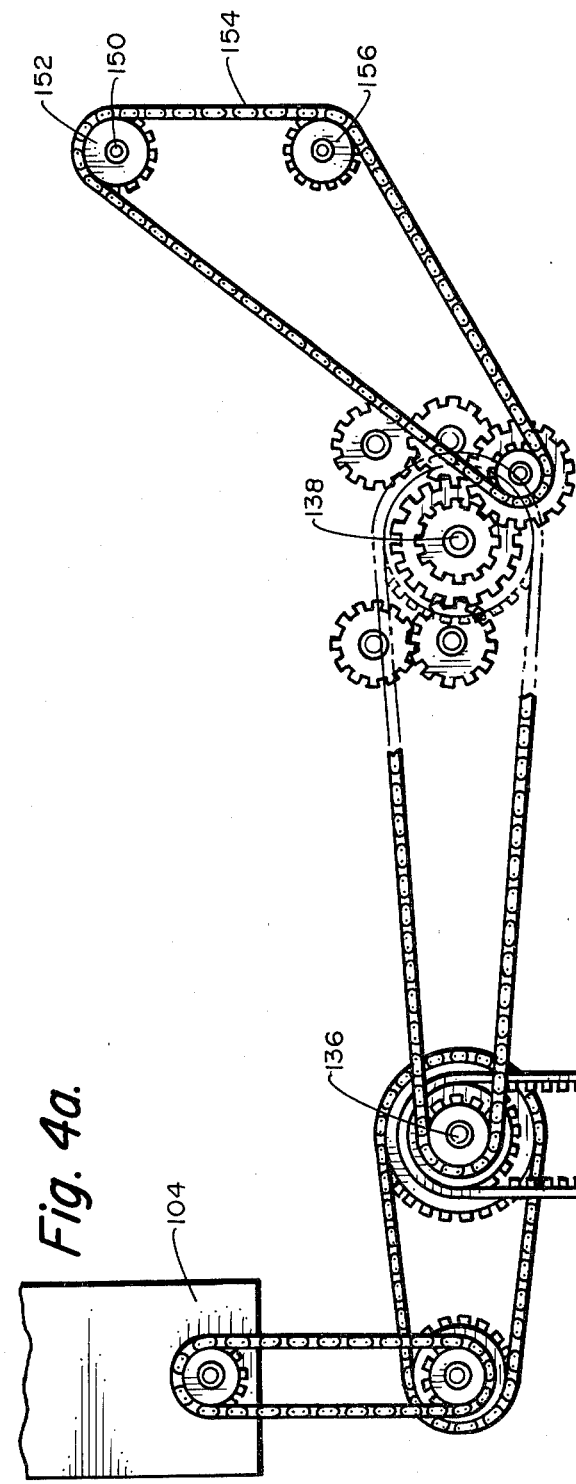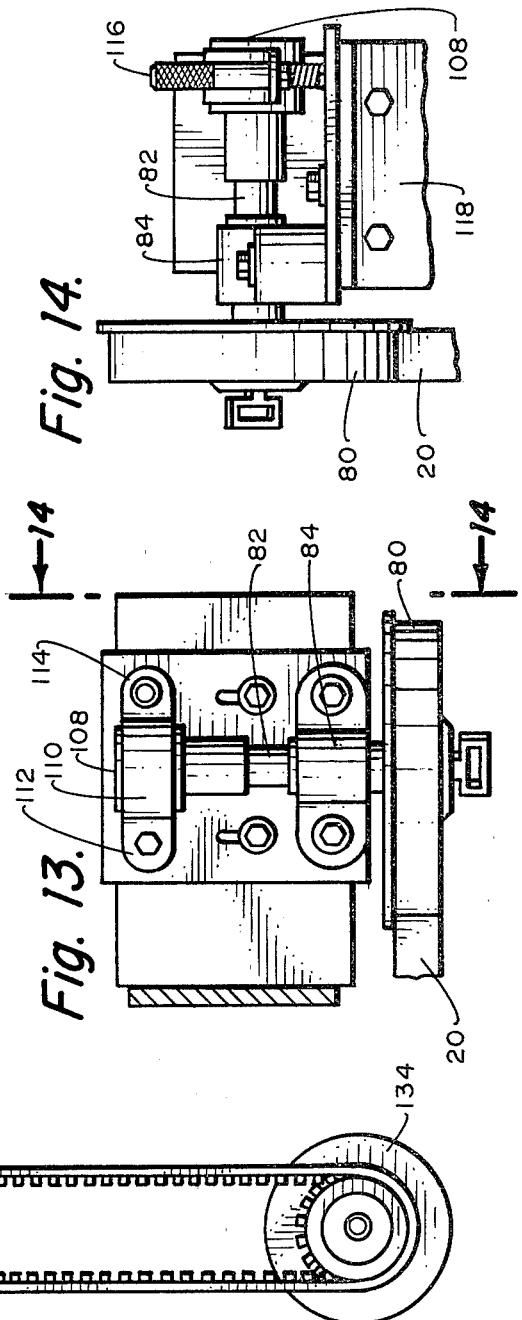

FLEXIBLE DUCT FORMING APPARATUS AND METHOD

BACKGROUND

This invention relates to flexible ducting and, more particularly, relates to an apparatus and method for manufacturing such flexible ducting.

Flexible ducting for use in heating and air conditioning applications is constructed of a reinforcing wire formed into a helix covered by a plastic material. One method of manufacturing such ducting is to use an elongated mandrel and fabricate the ducting in predetermined lengths. A reinforcing wire is wound on the mandrel and a sheet of plastic is then laid over the reinforcing wire. Adhesive on the wire secures the reinforcing wire to the plastic sheet. The flexible ducting may then be covered with insulation and an outer sleeve to complete the assembly.

There are also machines in the prior art for continuously forming flexible ducting, in which a reinforcing wire is continuously formed into a helix on a plurality of rollers or a mandrel which is simultaneously covered by continuous wraps of flexible strip material secured around the reinforcing wire with an adhesive. In one such device, reinforcing wire is wound on a plurality of supporting rollers mounted in circumferentially spaced relationship onto which the reinforcing wire and flexible strip material are fed to produce a flexible duct.

Another prior art device employs a cantilevered, free-wheeling mandrel which receives flexible strip material and reinforcing wire along a helical path with consecutive wraps of the flexible strip material forming a flexible duct with a continuous helical seam. Generally, the prior art devices require clinch rollers to drive and seal successive laps during use. They are also quite complex, and, although they provide means for manufacturing various diameter ducts, they are not readily adaptable for this purpose. Further, they are not readily adaptable for use with a variety of materials, and their rates of production (i.e., ft/min) is somewhat less than desirable.

SUMMARY

The purpose of the present invention is to provide an improved flexible duct forming apparatus readily adaptable to form flexible duct in a variety of diameters, of various materials utilizing a variety of sealing methods and having a relatively high production rate.

The present invention provides means for continuously winding reinforcing wire on a rotating mandrel at a predetermined pitch and encapsulating the wire in overlapping wraps of flexible strip material which is sealed around a wire in any suitable manner, such as with an adhesive. The reinforcing wire is deformed by a plurality of adjustable casting rollers and guided onto the rotating mandrel in a helix which is substantially constant in pitch and diameter. The pitch and diameter of the reinforcing wire guided onto the rotating mandrel is determined by a wire-forming assembly having a fixed helical means in the form of a helical ring having guide means attached to the ring. Flexible strip material is simultaneously wrapped around the mandrel in a helical pad from a supply roll with successive edges of the helically wrapped flexible strip overlapping to encapsulate the reinforcing wire.

In the preferred method, two continuous streams of adhesive are applied to one side of the flexible strip at the overlapping edge area as the strip is being wrapped on the mandrel. Sealing means is provided in the form of means to press the overlapping edges of the flexible strip material around the reinforcing wire to seal and encapsulate the wire. The feed systems for the reinforcing wire, flexible strip material, and adhesive, are all linked to a common drive system driven by a variable speed motor and, thus, automatically synchronized.

In order to produce flexible duct in a variety of diameters and of various materials, the flexible duct forming apparatus has a base with an adjustable bearing for cantilevered mounting of different diameter mandrels. In addition, the fixed helical means in the form of a wire-forming assembly having a helical ring is provided for each size mandrel and is adapted to be removably mounted on the base. The mandrel support bearing is adjustably mounted on a track attached to the base allowing set-up of the apparatus for different diameter ducts by simply replacing the mandrel with a different diameter and changing the wire-forming assembly accordingly. Thus, the flexible duct forming machine can be easily changed from producing one diameter duct to producing another in a relatively simply manner by replacing the mandrel and the fixed helical guide means.

It is one object of the present invention to provide a flexible duct forming apparatus which permits continuous forming of flexible duct of different diameters.

Another object of the present invention is to provide a flexible duct forming apparatus which is simple and easy to change from producing one diameter duct to the production of another.

Yet another object of the present invention is to provide a flexible duct forming apparatus which has interchangeable mandrel and reinforcing wire forming means for producing different diameter ducts.

Still another object of the present invention is to provide a flexible duct forming apparatus in which the feed system for the materials for forming the flexible duct are automatically synchronized.

Yet another object of the present invention is to provide a flexible duct forming machine having a variable drive system for simplifying start-up and synchronization of the various materials forming the duct.

Still another object of the present invention is to provide a flexible duct forming machine adaptable to provide flexible duct from a variety of materials.

Another object of the present invention is to produce flexible duct from a variety of flexible strip materials using various sealing methods.

Yet another object of the present invention is to provide a flexible duct forming apparatus having an interchangeable helical ring for guiding reinforcing wire in a substantially constant helix onto a rotating mandrel.

Still another object of the present invention is to provide a flexible duct forming apparatus and method which permits continuous formation of flexible duct at a relatively high production rate by use of a fixed helical means for feeding reinforcing wire and flexible strip material to a rotating mandrel.

These and other objects, advantages and novel features of the invention become apparent from the following detailed description of the invention, when considered in conjunction with the accompanying drawings in which like reference numbers identify like parts throughout, wherein:

FIG. 4a is a schematic rear view illustrating the drive system for the flexible duct forming apparatus shown in FIG. 4;

FIG. 13 is a top view in partial section illustrating an adjustable braking device for the flexible strip material delivery system at 13—13 of FIG. 1;

FIG. 14 is a side view in partial section taken at 14—14 of FIG. 13.

DESCRIPTION OF THE PREFERRED EMBODIMENT

Figure 1:
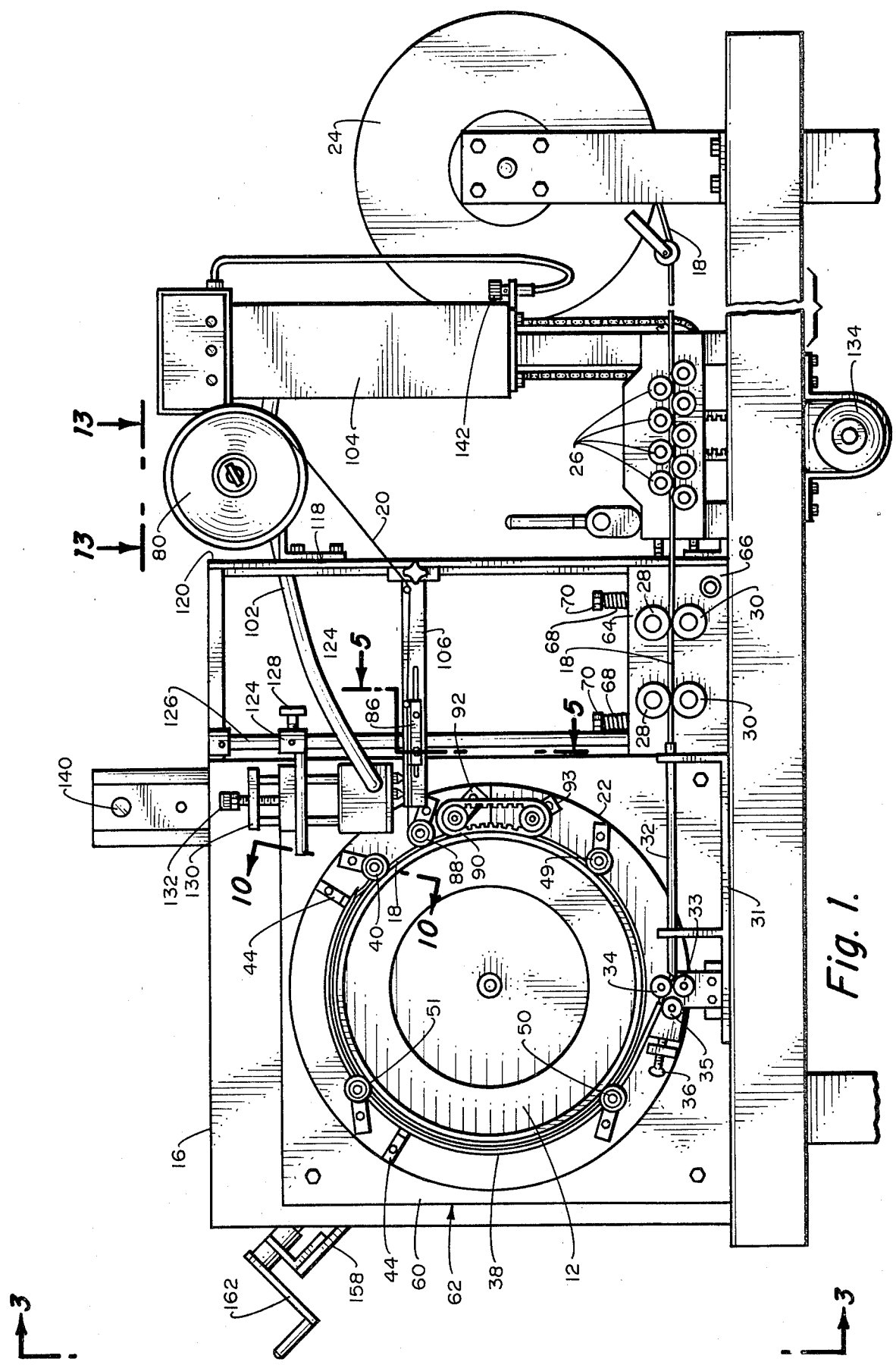
FIG. 1 is a front elevational view of the flexible duct forming apparatus of the present invention.
Figure 2:
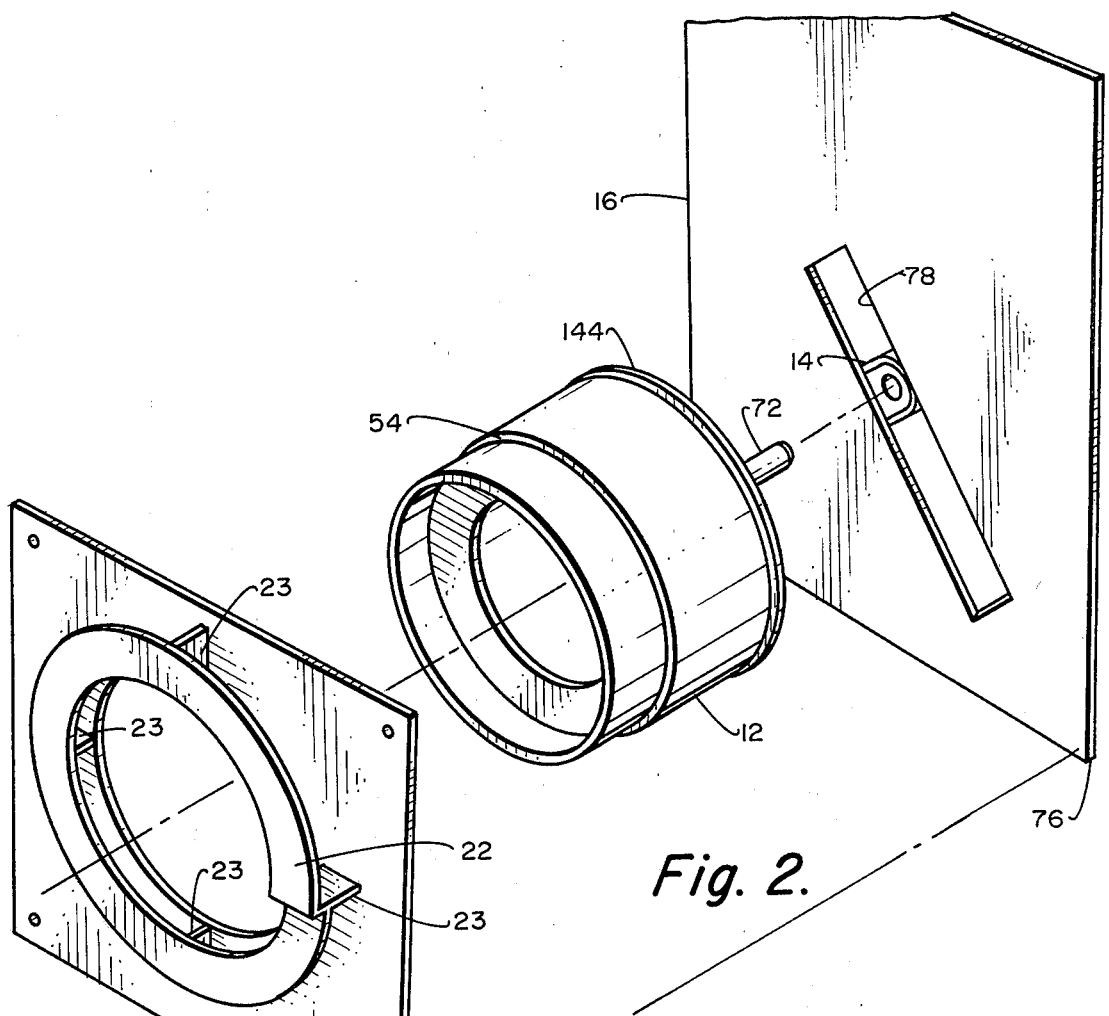
FIG. 2 is a perspective view, illustrating the interchangeability of the mandrel and fixed helical means of the flexible duct forming apparatus.
Figure 3:
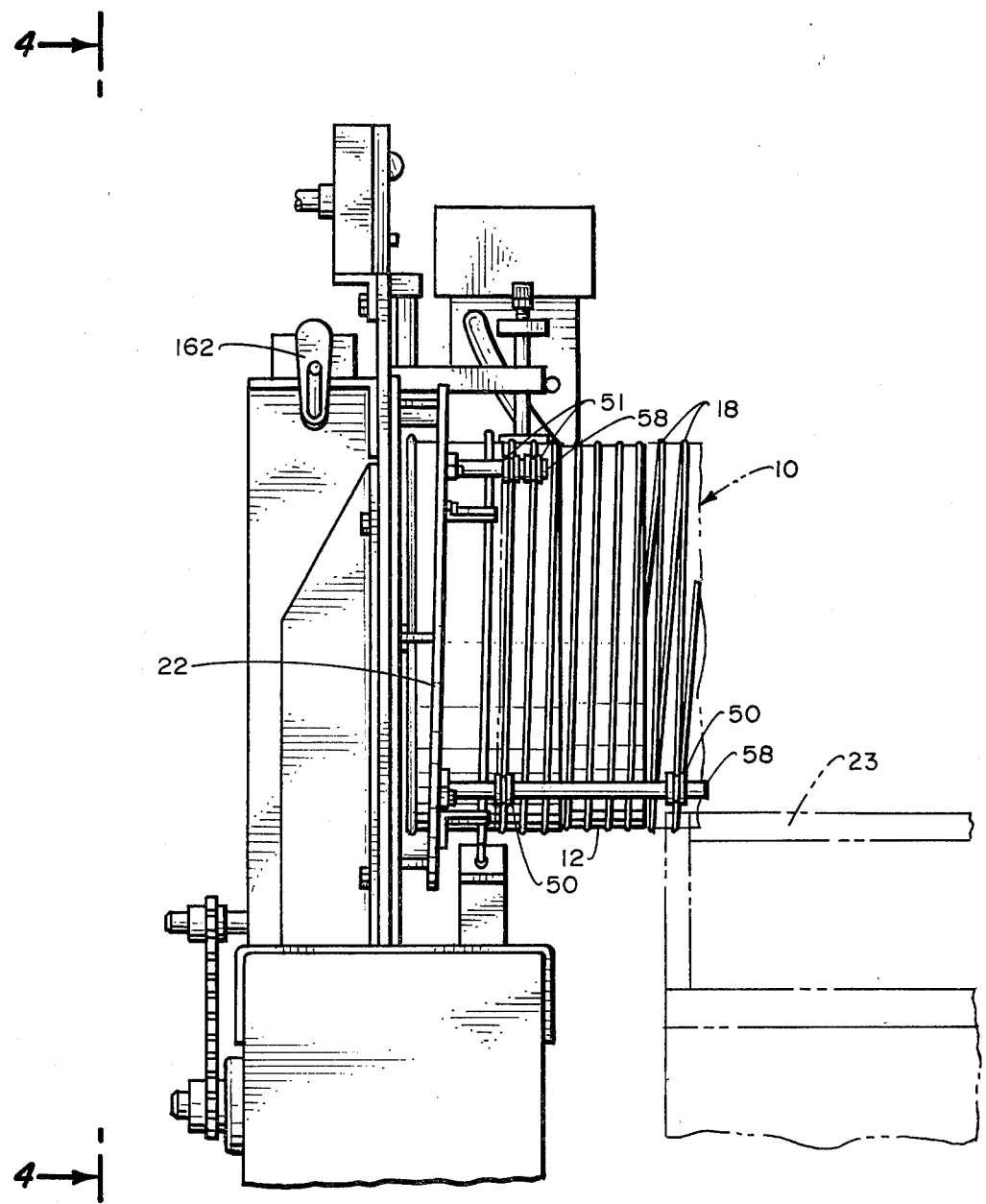
FIG. 3 is a side view in partial section of the flexible duct forming apparatus taken at 3—3 of FIG. 1.
Figure 5:
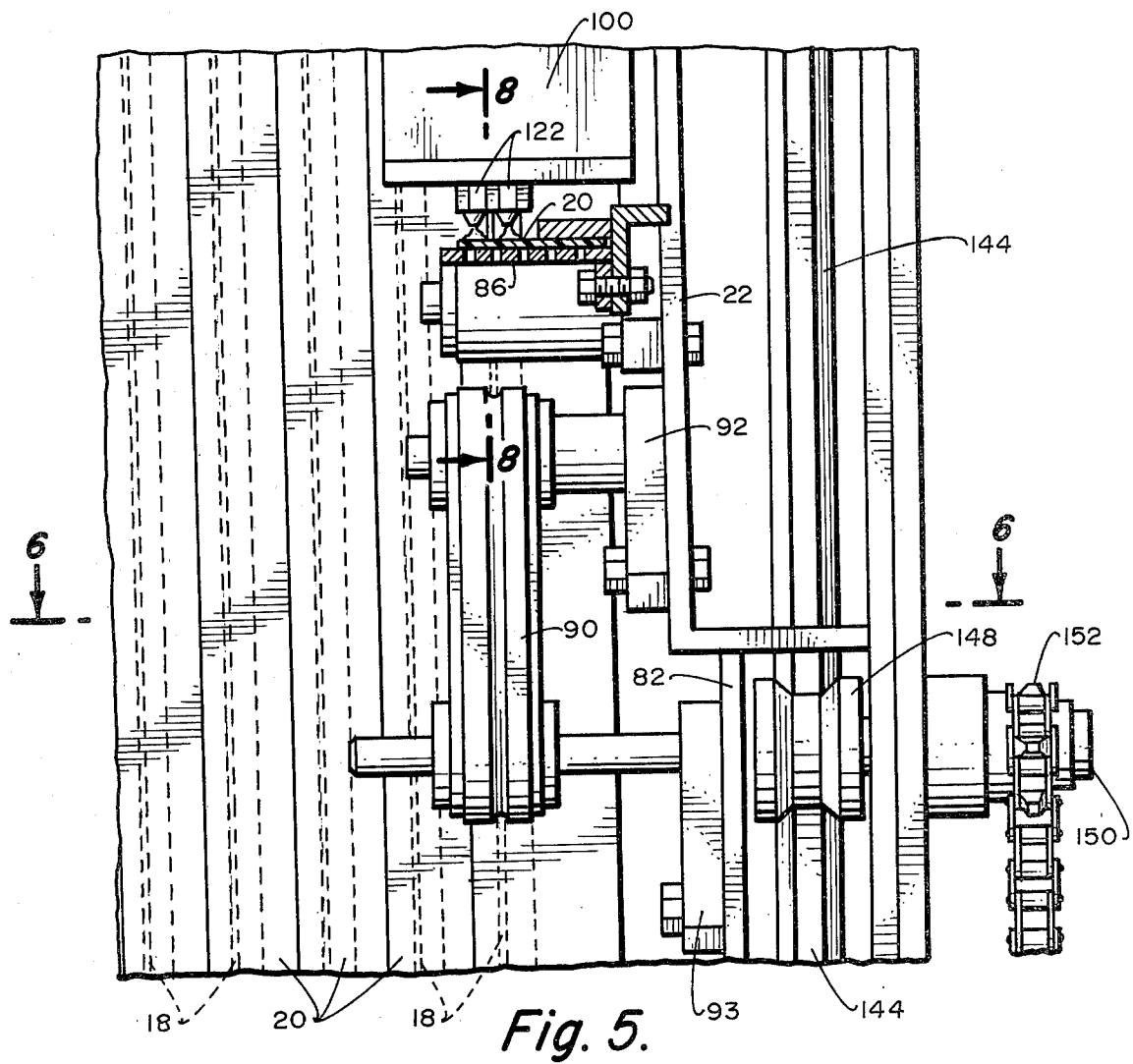
FIG. 5 is a partial sectional view illustrating the wrapping of the flexible strip material on the mandrel taken at 5—5 of FIG. 1.
Figure 6:
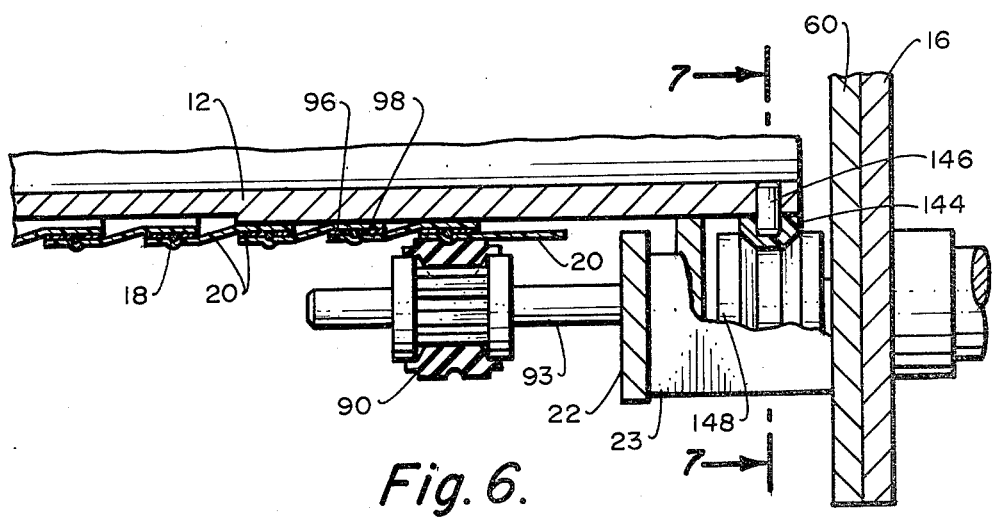
FIG. 6 is a partial sectional view taken at 6—6 of FIG. 5.
Figure 9:
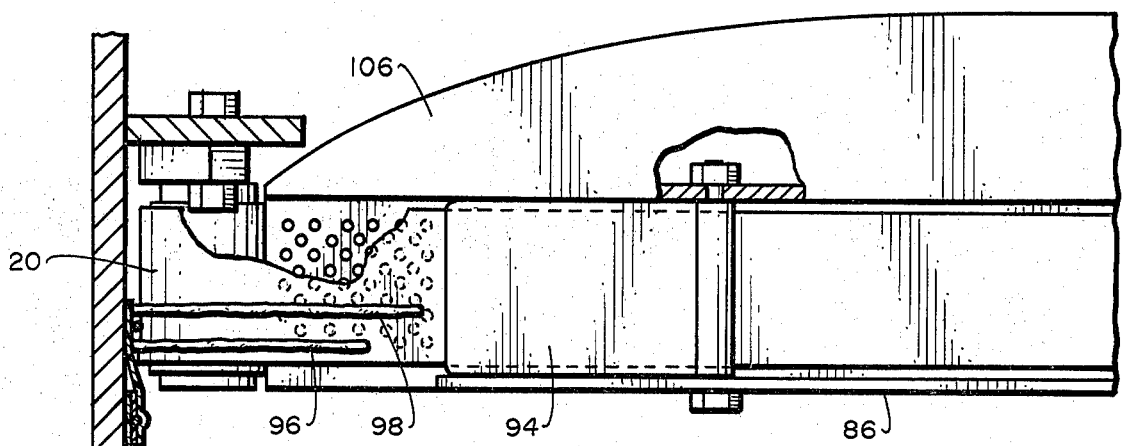
FIG. 9 is a partial sectional view taken at 9—9 of FIG. 8.
Figure 7:
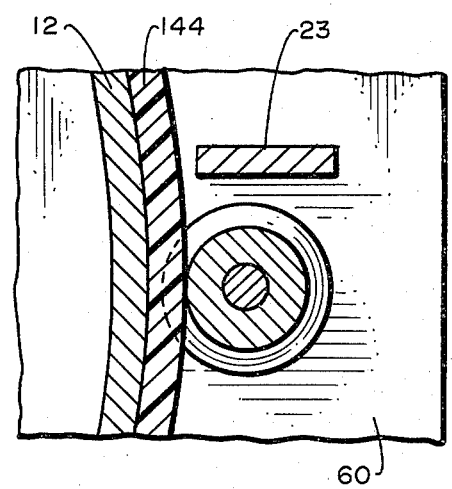
FIG. 7 is a partial section illustrating the drive system for the mandrel taken at 7—7 of FIG. 6.
Figure 11:
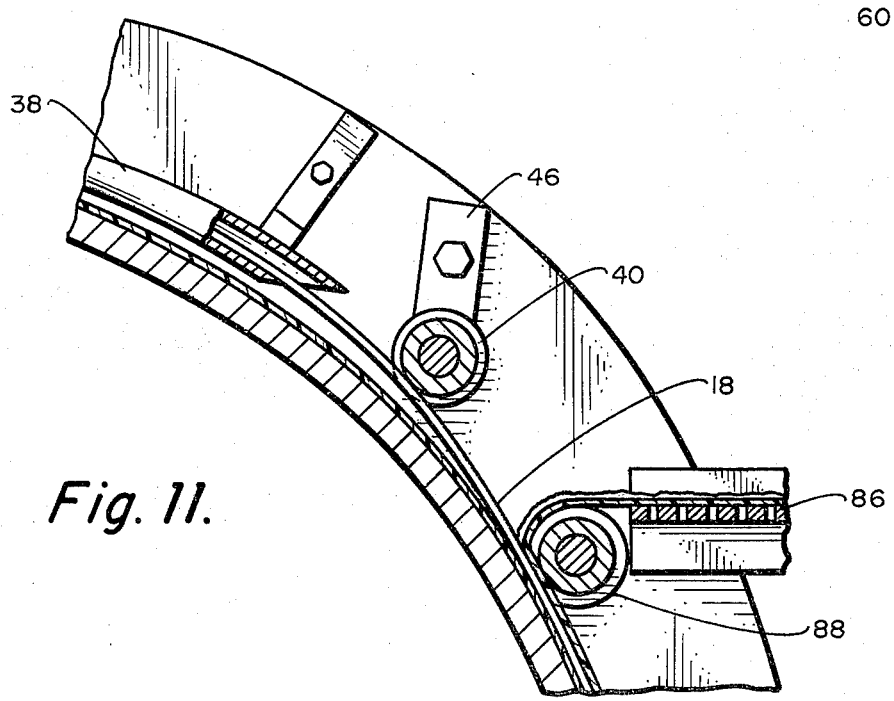
FIG. 11 is a partial sectional view illustrating the reinforcing wire guide system taken at 11—11 of FIG. 10.

Referring now to FIGS. 1 through 3 of the drawings, a flexible duct 10 (shown in phantom lines for clarity) is continuously formed on a mandrel 12 supported by an adjustable bearing 14 mounted on a base plate 16. As is known in the art, flexible duct is formed of a flexible material with a tubular shape being maintained by reinforcing wire covered by the flexible material. In the flexible tubular duct of the present invention, the reinforcing wire 18 is guided onto the mandrel 12 in a helical path which is substantially constant in diameter and pitch. Flexible strip material 20 is wrapped around the mandrel 12, also in a substantially constant helical path with adjacent wraps of the flexible material overlapping as shown in FIGS. 5 and 6. The reinforcing wire 18 is guided between the overlapping wraps and encapsulated by sealing these overlapping edges in any suitable manner, such as with an adhesive or by the application of heat. Flexible tubular duct will be continuously formed on the rotating mandrel as flexible strip material and reinforcing wire is supplied during operation. The flexible tubular duct is delivered to a conveyor shown in phantom at 23 of FIG. 3 for cutting into conveniently selected lengths.

The reinforcing wire 18 is formed into a helix of substantially constant diameter and pitch by the wire-forming assembly 62. The wire 18 is fed from a supply roll 24 through a series of straightening rollers 26, drive rollers 28 and 30, to guide tube 32. The wire 18 then passes through casting rollers 33, 34, and 35 which bend or deform the wire 18 to produce a coil diameter conforming to the size of the mandrel 12 being used to form the tubular duct 10. The casting roller 35 is adjustable by thumb screw 36 to set the amount of deformation of the wire to fit the particular mandrel. Once set, little of any further adjustment need be made to the casting rollers because they will remain with the fixed helical ring 22 of the wire forming assembly 62 when removed from the machine, as will be described in greater detail hereinafter.

The deformed wire 18 is then guided onto the mandrel 12 by passing through arcuate guide tube 38, under guide roller 40, having a circumferential groove 42 in registration with the wire 18. The guide tube 38 and guide roller 40 are mounted on fixed helical ring 22 and thus provide a continuous helical pitch for the reinforcing wire 18. The guide tube 38 is attached to the helix ring 22 by means of brackets 44 which thus keeps the pitch constant. The guide roller 40 is mounted on shaft 58 attached to a bracket 46 adjustably fastened to the helical ring 22 by bolt 48. Thus, the position of the guide roller 40 relative to the mandrel 12 can be varied by loosening the bolt 48 and rotating the bracket 46.

As can be seen, additional guide rollers 49, 50 and 51 adjustably mounted on the helical ring 22 are spaced around the mandrel 12. Each of these guide rollers has a groove similar to groove 42 in roller 40 in registration with the reinforcing wire to guide completed flexible tubular duct off the mandrel 12 onto the conveyor or table 23. To assist in off-loading the flexible tubular duct, the mandrel may be undercut as shown at 54.

Figure 10:
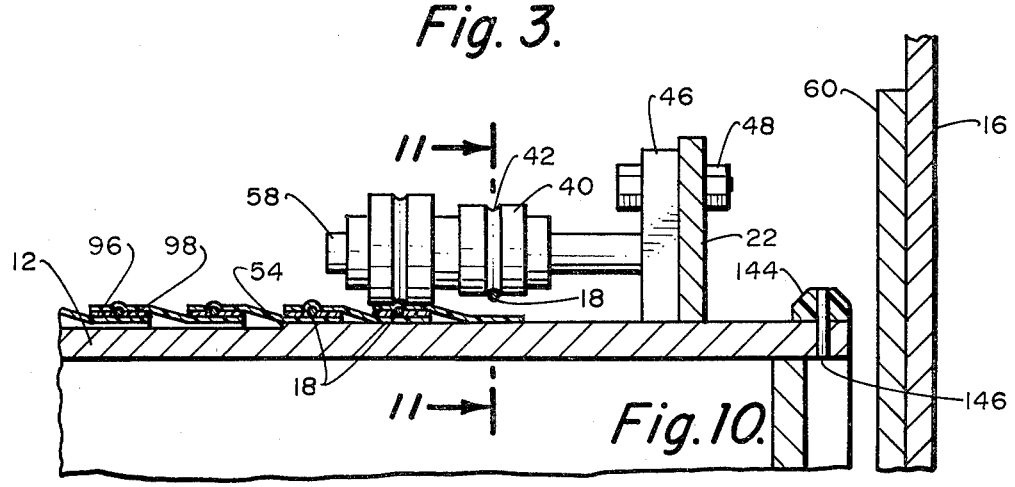
FIG. 10 is a partial sectional view taken at 10—10 of FIG. 1.

As can be seen in FIG. 10, the guide rollers are mounted on shafts 58 attached to the respective bracket for adjusting the position of the roller relative to the mandrel 12. Each shaft may have two or more rollers having their groove in registration with the reinforcing wire of the tubular duct and it is preferred that there be sufficient rollers to continue to guide the duct for at least one complete revolution after sealing.

The wire-forming assembly 62 having the helical ring 22 is shown more clearly in FIG. 2 with the guide rollers and casting rollers removed for clarity. The helical ring 22 is supported on plate 60 by varying height standoffs 23 thus providing a complete reinforcing wire assembly; that is, the fixed helical ring 22 with the arcuate guide tube 38 and guide rollers adjustably attached. Also attached to the plate 60 is a bracket 31 supporting tubular guide 32 and casting rollers 33, 34 and 35 as well as thumb screw adjustment 36. Thus, to change the duct forming apparatus to produce different diameter duct, the entire wire forming assembly 62 may be removed from the base 16 intact. If the particular wire forming assembly 62 is later replaced on the flexible duct forming apparatus, little, if any, adjustment will need to be made to begin a production run of that diameter flexible tubing. The wire forming assembly 62, by virtue of the fixed helical ring 22, will thus maintain a substantially constant diameter and pitch for the reinforcing wire even when the apparatus is changed from one diameter duct to another. This particular feature is not only advantageous because it allows the duct forming apparatus to be easily changed from one diameter duct to another, but also because the constant diameter and pitch of the reinforcing wire allows a higher rate of production. This is because the rate of production can be increased without substantially affecting the fixed diameter and pitch set by the wire-forming assembly 62.

As can be seen in the side view of FIG. 3, each guide roller shaft 58 has at least two rollers. The particular length of the shaft 58 determines the position of the roller with respect to the mandrel and reinforcing wire 18, and the helical ring 22 supporting the rollers automatically sets the proper angle of contact.

The amount of deformation imposed on the reinforcing wire 18 is determined by the casting or deforming rollers 33 through 35. Casting roller 35 is adjustable through thumb screw 36 toward or away from idler rollers 33 and 34, changing the amount of deformation of the reinforcing wire 18. Once, however, the particular amount of deformation is determined for a particular wire-forming assembly, little, if any, further adjustment will be needed to be made when changing from one diameter duct to another; that is, changing from one wire-forming assembly to another.

The drive rollers 28 and 30 of the reinforcing wire feed system are spring-loaded to accommodate different size wire and also vary the amount of frictional force applied by the drive rollers to the wire. The drive rollers are mounted on upper and lower frames 64 and 66, respectively, and spring-loaded by means of springs 68. The spring 68 encircles threaded shafts attached to lower frame 66, which slides through holes (not shown) in upper frame 64. Adjustment of the nuts 70 on top of the threaded shaft varies the amount of spring force applied by the spring 68 on the upper frame 64, thus varying the bite between the drive rollers 28 and 30.

As was stated previously, a unique feature of the invention is the interchangeability of wire-forming assembly 62 with an appropriate diameter mandrel 12. For each diameter flexible duct, a different diameter mandrel 12 will be provided. The mandrel 12 is comprised of a drum having a centrally located mounting shaft 72 for insertion in the adjustable bearing 14. The appropriate wire-forming assembly is then attached to the base plate encircling the mandrel 12. The base 16 will have an appropriate hole pattern (not shown) for mounting different size wire forming assembly mounting plates 60. To simplify changing from one wire-forming assembly to another, the lower corner 74 of the wire-forming assembly plate 60 will be matched with the lower corner 76 of the base 16. Thus, the adjustable bearing 14 is mounted on the base 16 behind a diagonal slot 78 for adjustment toward the corner 76 for smaller size mandrels. The larger the mandrel, the more adjustment of bearing 14 toward the center of base 16.

The feed system for the flexible strip material 20 is comprised of a free-wheeling roll of material 80 mounted on a shaft 82 supported by a bearing 84. The flexible strip material is passed over a guide plate 86, a roller 88, between a nip formed between belt 90 and the mandrel 12. The flexible strip is continuously wrapped in a helical path controlled by the belt 90. The proper helical path is determined by the fact that the supports for the belt 90 are also mounted on the fixed helical ring 22. The belt 90 is mounted on a shaft attached to a bracket 92 for adjusting the amount of force between the belt 90 and the mandrel 12. The roller 88 and belt 90 also are provided with grooves for registration with the reinforcing wire 18. For smaller diameter flexible duct, the belt 90 may be in the form of a single roller mounted on the bracket 92. As can be seen in FIG. 5, the belt 90 wraps the flexible strip material 20 around the mandrel in the proper helical path determined by the helical plate 22 supporting the belt 90 on brackets 92 and 93.

No separate drive system is needed for the flexible strip material as the frictional force between the belt 90 and the mandrel 12 is sufficient to pull the flexible strip material from the roll 80 over the guide plate 86, guide roller 88, onto the mandrel to be wrapped continuously with overlapping edges, as can be seen in FIGS. 5 and 6.

The belt 90 also serves a dual purpose in that it will seal the flexible strip material 20 around the reinforcing wire 18 encapsulating the wire to continuously form the flexible tubular duct. Thus, the belt 90 serves as means for pressing the overlapping edges of the flexible strip material 20 together to seal the material in addition to providing the frictional force necessary to wrap the material onto mandrel 12.

In the preferred embodiment, the flexible strip material 20 is sealed around the reinforcing wire 18 by means of an adhesive applied to the strip material just prior to it entering the nip between the belt 90 and the mandrel 12. As the flexible strip material passes over the guide 86, beneath a weighted smoothing plate 94, adhesive is applied in two continuous streams 96 and 98 from an adhesive-dispensing head 100. The adhesive is supplied to the dispensing head 100 through a tube 102 connected to a hopper 104 which produces a hot melt glue. Although in the preferred embodiment, hot melt glue is shown and described, other methods of sealing the flexible strip may be used if desired, such as solvent or by application of heat.

Figure 8:
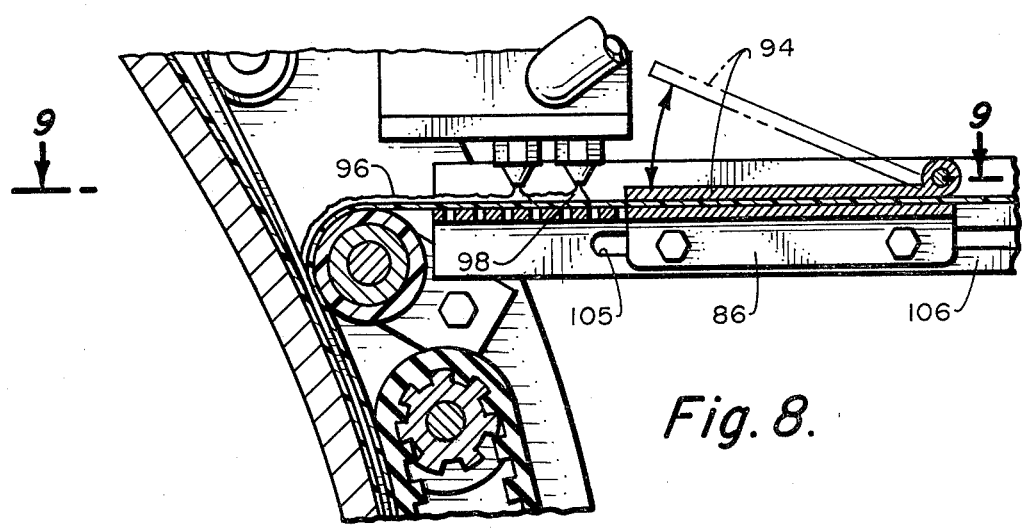
FIG. 8 is a partial sectional view taken at 8—8 of FIG. 5.

Of course, the flexible strip supply system is adjustable to accommodate different diameter mandrels and thus produce different diameter ducts. For example, the guide plate 86 is mounted on a vertically adjusted guide arm 106, attached to from 120 for raising or lowering the guide plate according to the diameter of the duct being produced. Additionally, the guide plate 86 is horizontally adjustable in slot 105 on the guide arm 106 as shown in FIG. 8. Holes are provided in the end of the guide plate 86 beneath the area where the continuous streams of adhesive 96 and 98 are applied for cooling purposes.

The flexible strip feed system also permits producing flexible duct of a variety of flexible strip materials, aluminum, scrim, and various flexible plastics. Since all of these materials vary in flexibility, some control must be provided over the free-wheeling roll 80. This control is illustrated in FIGS. 13 and 14. To control the tension on the flexible strip material 20, supplied from the free-wheeling roll 80, a drum 108 is provided on the end of the shaft 82. A brake is provided in the form of a flexible band 110, secured at one end, passing over the drum 108. The opposite end 114 of the band 110, is adjustable by means of micrometer adjustment device 116 to vary the force applied by the flexible band 110 on the drum 108. Thus, by rotating the micrometer adjustment 116, friction can be applied to the drum 108, increasing the tension on the flexible strip material 20. The versatility of the flexible duct forming apparatus is thus considerably increased because a wide variety of flexible strip material can now be used to produce the flexible duct. The bearing 84 and brake means are mounted on a bracket 118 attached to frame 120 supporting the vertically adjustable guide arm 106.

Since the guide plate 86 must be adjustable to accommodate different size flexible ducts, so too the adhesive dispensing head 100 must be adjustable. That is, the adhesive dispensing head 100 is provided with a pair of nozzles 122 for laying down the two continuous streams 96 and 98 on the flexible strip material 20 passing over the guide plate 86. Thus, the adhesive dispensing head 100 must raise or lower in conjunction with the guide plate 86. To accomplish this, the adhesive dispensing head is mounted on a collar 124, slideably supported on vertical shaft 126 for adjustment. As the shaft 126 is cylindrical, the adhesive dispensing head 100 may slide or rotate on the shaft to provide for vertical and horizontal adjustment. The adhesive dispensing head 100 is clamped on the shaft 126 by means of screw 128. Fine adjustment of the glue dispensing head is provided through a yoke 130 having a fine adjustment through screw 132.

The drive system for the rotating mandrel 12, reinforcing wire feed system, flexible strip material feed system, and adhesive dispensing system, are all provided by a single source eliminating the necessity of synchronizing the operation of these various components. A variable speed motor 134 is connected through gears on intermediate shaft 136 to gears on intermediate shaft 138 in engagement with gears mounted on wire feed rollers 28 and 30. The intermediate shaft 138 is also geared to drive means for rotating the mandrel which will be described in greater detail hereinafter. Intermediate shaft 130 is also connected through gears to a pump (not shown) for pumping adhesive from hopper 104. The speed of the motor 134 is controlled by a variable rheostat 140 (FIG. 1.) This permits low running speeds at start-up and allows for high production speeds after a few feet of completed duct have been successfully produced. Thus, the variable speed motor 134 controls the rate of delivery of reinforcing wire 18, flexible strip material 20, and adhesive from adhesive-dispensing head 100, while simultaneously controlling the rotational speed of the mandrel 12. In addition, the glue delivery system includes a fine adjustment 142 to effectively control the flow of adhesive from nozzles 122 on the glue dispensing head.

The drive system for the mandrel 12 is unique in that the mandrel is moved to engage the drive system rather than vice versa. As can be seen in FIGS. 2 through 7, and 12, a reversed pulley V-belt 144 is circumferentially mounted on the inner end of the drum portion of the mandrel 12 and secured from slipping by a plurality of pins 146. Rotation of the mandrel 12 is accomplished by bringing the belt 144 into engagement with the pulley wheel 148 mounted on shaft 150. The shaft 150 is driven by means of spocket 152 linked through intermediate shaft 138 to the motor 134. Thus, the motor 134 drives chain 154 passing over idler gear 156 to rotate sprocket 152 and shaft 150, thus driving the mandrel through engagement of the reversed pulley belt 144 and the pulley wheel 148.

Figure 12:
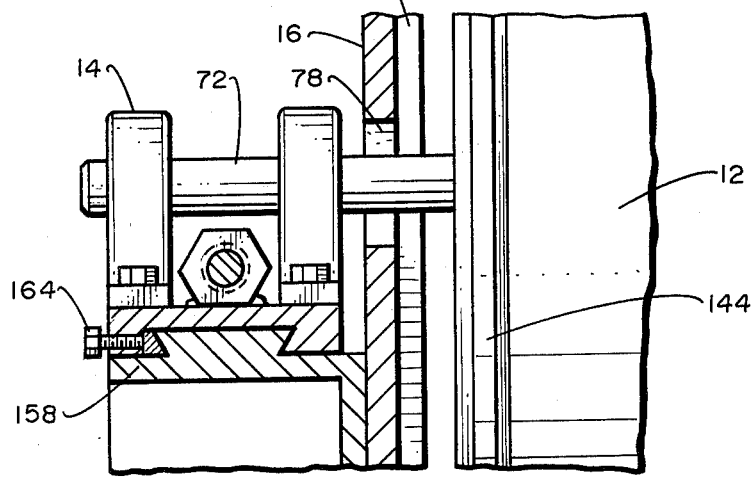
FIG. 12 is a partial sectional view taken at 12—12 of FIG. 4.
Figure 4:
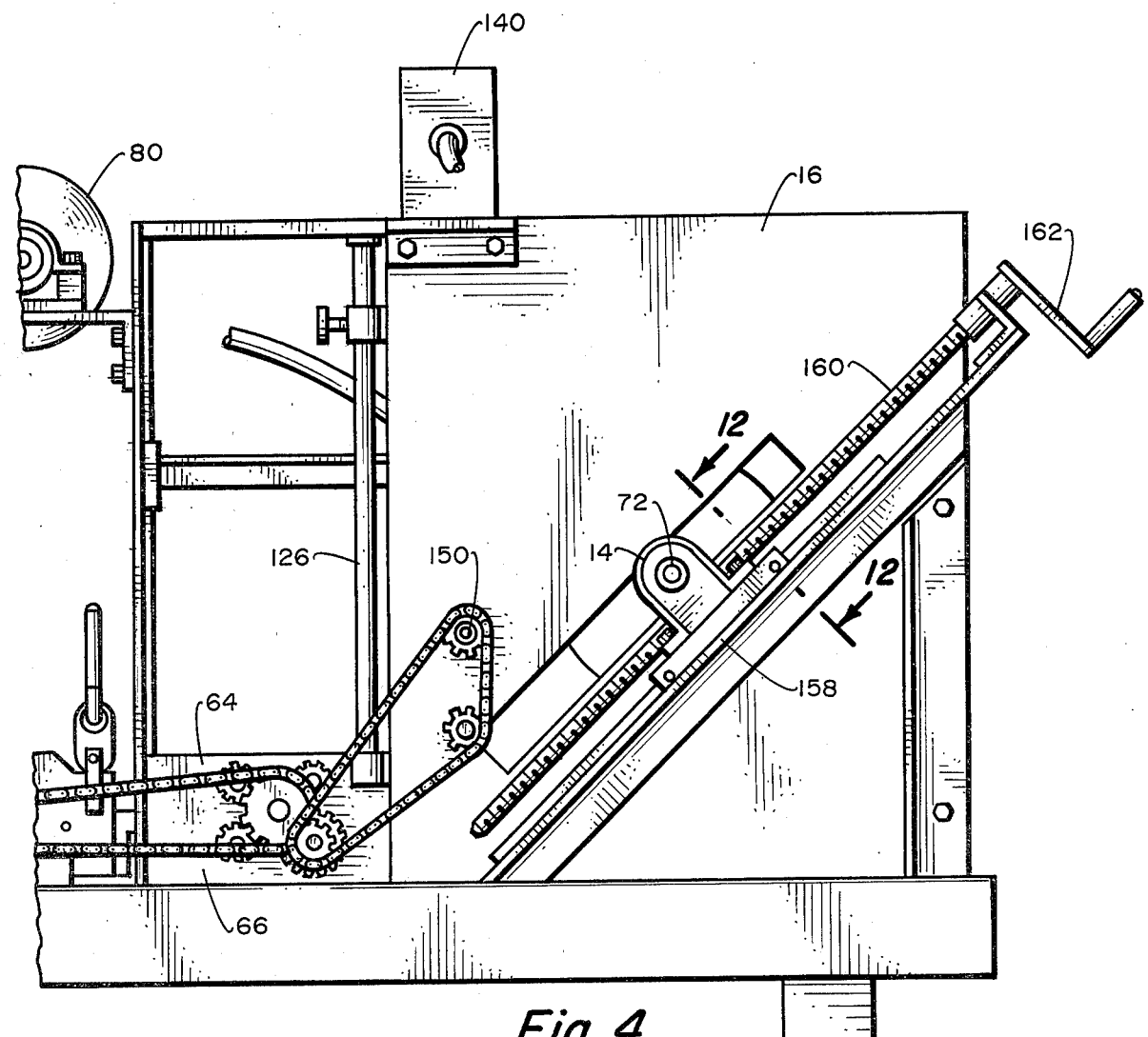
FIG. 4 is a rear view in partial section of the flexible duct forming apparatus taken at 4—4 of FIG. 3.

The adjustable mounting for the mandrel 12 can be seen more clearly in FIG. 4. The adjustable bearing 14 is slideably supported on a track 158. The shaft 72 of the mandrel 12 engages the bearing 14 as can be seen in FIG. 12. The position of the mandrel 12 can now be adjusted by rotation of worm screw 160 through crank 162. The worm screw 160 engages the bearing 14 as shown in FIG. 12 moving it along the track 158. A screw 164 is provided for locking the position of the bearing on the track once the mandrel has been adjusted such that the belt 144 is in engagement with the pulley wheel 148.

Thus, to change the flexible duct forming apparatus, from production of one diameter duct to another, the flexible strip material 20 and reinforcing wire 18 are withdrawn and the wire forming assembly 62 unbolted and lifted off the base 16. The crank 162 may now be operated to move the mandrel and thus the belt 144 away from the pulley wheel 148. The mandrel shaft 72 may now be withdrawn from the adjustable bearing 14.

A new mandrel is then inserted in the bearing and the crank 162 again operated until the belt on the replaced mandrel again engages the pulley wheel 148. The associated wire-forming assembly 62 is then slipped over the mandrel and the wire-forming assembly base plate 60 bolted to the base 16. The flexible duct forming apparatus is then turned on and flexible strip material 20 fed into the nip between the belt 90 and the mandrel 12. If necessary, the bite may be adjusted according to the type of flexible strip material used. Reinforcing wire 18 is then fed into the guide tube 32 through the casting rollers 33 through 35, and into the arcuate guide tube 38. During this operation, the machine is run at a very slow speed controlled by the rheostate 140. A few feet of flexible duct material may then be produced to determine if any minor adjustments in the application of adhesive, flexible strip feed system, or reinforcing wire feed system need to be made. If the wire-forming assembly 62 has been previously used, little or no adjustment will need to be made. After it has been determined that a few feet of flexible duct have been successfully produced, the machine may be increased in speed to provide high speed production run.

Thus, there has been described a flexible duct forming machine or apparatus and method in which the machine can be quickly and easily changed from the production of one diameter duct to the production of another. This is accomplished by using a reinforcing wire-forming assembly which can be removed and replaced without the necessity of adjusting any of the diameter and pitch forming guides which are mounted on a fixed helical ring, eliminating any change in the diameter or pitch when changing from one diameter duct to another. The wrapping of flexible strip material on the rotating mandrel to produce the flexible duct is also controlled by the same wire forming assembly and includes brake adjustment means for accommodating a number of types of flexible material such as plastic, aluminum foil, or fiberglassed reinforced foil called "scrim." The apparatus or machine described herein can continuously produce an improved flexible tubular duct in a variety of sizes of various materials in a relatively high-speed operation.

Obviously, many modifications and variations of the present invention are possible in light of the above teachings. It is therefore to be understood that the full scope of the invention is not limited to the details disclosed herein, but only by the claims, and may be practiced otherwise than as specifically described.

What is claimed is:
1. A method of producing flexible duct comprising;
feeding flexible strip material to a mandrel;
rotating said mandrel;
wrapping said flexible strip material on said rotating mandrel in a continuous helix, with each successive wrap having overlapping edges;
feeding reinforcing wire to said mandrel;
deforming said reinforcing wire to produce a predetermined coil diameter;
guiding and holding said reinforcing wire on a substantially fixed helical path of constant pitch and diameter from the deforming step to between the overlapping edges of flexible strip material;
sealing said overlapping edges of flexible strip material to each other to encapsulate said wire thereby continuously forming flexible duct.
2. The method according to claim 1 including the steps of;

passing said wire through adjustable casting rollers to deform said wire to a fixed diameter;
guiding said deformed wire around a fixed helical member;
whereby said wire is formed into a helix having a substantially constant pitch and diameter.

3. The method according to claim 1 wherein the step of sealing the overlapping edges of flexible strip material comprises;
applying an adhesive to the overlapping edges;
pressing the overlapping edges together around the wire against the surface of said mandrel.

4. The method according to claim 2 in which the steps of wrapping and pressing the flexible strip material together are performed simultaneously by a press means adapted to press the overlapping edges of strip material against the mandrel creating a frictional force which pulls the flexible strip material from a supply roll.

5. The method according to claim 3 including;
mounting said press means on said fixed helical member whereby the flexible strip material is automatically wrapped in the correct helical path.

6. The method according to claim 4 including;
mounting said mandrel on adjustable bearing means whereby different diameter mandrels can be accommodated to produce different diameter duct.

7. A flexible duct forming apparatus comprising;
a base;
a mandrel;
support means on said base for rotatably supporting said mandrel;
drive means for rotatably driving said mandrel;
flexible strip material feed means for feeding flexible strip material to said mandrel;
wrapping means for wrapping said flexible strip onto said mandrel in a helical path with adjacent wraps having overlapping edges;
wire feed means comprising;
wire deforming means for deforming said wire to produce a predetermined coil diameter,
wire guide means forming a substantially fixed helical path of constant pitch and diameter for guiding and holding said wire on said substantially fixed helical path from said wire deforming means to between the overlapping edges of said flexible strip material,
sealing means for sealing the overlapping edges of said flexible strip material to encapsulate said wire whereby flexible wire reinforced duct is continuously formed on said mandrel.

8. Apparatus according to claim 7 in which said wire feed means includes fixed helical means interchangeably mounted on said base.

9. Apparatus according to claim 8 in which said fixed helical means is a helical ring encircling said mandrel.

10. Apparatus according to claim 9 in which said guide means are adjustably mounted on said fixed helical means.

11. Apparatus according to claim 10 in which said helical ring with said guide means attached is supported on means adapted to be removably mounted on said base whereby said helical ring and guides may be interchanged to produce different diameter flexible duct.

12. Apparatus according to claim 11 in which said wire deforming means includes;
a plurality of casting rollers for deforming said wire to a predetermined diameter;
means guiding said wire through said casting rollers;
one of said casting rollers being adjustable to vary the deformation imparted to said wire.

13. Apparatus according to claim 12 in which said plurality of casting rollers is attached to said means adapted to be removably mounted on said base whereby the casting roller adjustment will remain fixed when interchanging said fixed helical means to produce different diameter flexible tubing.

14. Apparatus according to claim 13 including;
a plurality of guide rollers spaced around said fixed helical means; and
an arcuate tubular member mounted on said fixed helical means.

15. Apparatus according to claim 14 in which each of said guide rollers has a circumferential groove registrable with said wire; said guide rollers being adjustably mounted on said fixed helical means to adjust their spacing relative to the mandrel.

16. Apparatus according to claim 15 in which said plurality of guide rollers is in registration with said wire for at least one complete revolution beyond the sealing of said flexible strip means whereby said guide rollers effectively guide the completed flexible tubing off said mandrel.

17. Apparatus according to claim 16 in which said sealing means includes;
press means for pressing the overlapping portion of said flexible strip material against said mandrel;
said press means having a groove in registration with said wire.

18. Apparatus according to claim 17 in which said press means is adjustably mounted whereby the pressure applied against the mandrel may be varied.

19. Apparatus according to claim 18 in which said press means is mounted on said fixed helical means.

20. Apparatus according to claim 19 in which said press means comprises a belt.

21. Apparatus according to claim 20 in which said flexible strip feed means includes;
a roll of flexible strip material mounted on a freewheeling wheel;
guide plate means for guiding said flexible strip material as it is fed to said mandrel;
pulling means for pulling said flexible strip material from said roll across said guide plate onto said mandrel.

22. Apparatus according to claim 21 in which said wrapping means includes said pulling means.

23. Apparatus according to claim 22 in which said wrapping means is mounted on said fixed helical means whereby the helical angle of said wrapping means remains substantially constant.

24. Apparatus according to claim 23 in which said wrapping means is adjustably mounted so that the pulling force is adjustable.

25. Apparatus according to claim 24 in which said wrapping means includes said sealing means.

26. Apparatus according to claim 25 in which said sealing means includes;
press means for pressing the overlapping portion of said flexible strip material against said mandrel;
said press means having a groove slightly larger than and registrable with said wire.

27. Apparatus according to claim 26 in which said press means is adjustably mounted whereby the pressure applied against the mandrel may be varied.

28. Apparatus according to claim 27 in which said press means comprises a belt.

29. Apparatus according to claim 28 in which said pulling means comprises the frictional force between said belt and said mandrel during the sealing.

30. Apparatus according to claim 21 including means for applying a variable tension to the flexible strip material roll.

31. Apparatus according to claim 30 in which said wheel includes;
a shaft supporting said wheel in a bearing;
a drum mounted on the opposite end of said shaft from said bearing;
friction means for applying friction to said drum for increasing the tension on the flexible strip material coming from said roll.

32. Apparatus according to claim 31 in which said friction means comprises:
a flexible band passing over said drum;
tightening means for tightening said band on said drum to vary the frictional force.

33. Apparatus according to claims 7, 8 or 9 in which said sealing means includes adhesive feed means for applying adhesive to the overlapping edge of said flexible strip means to seal said overlapping edges with said sealing means.

34. Apparatus according to claim 21 including:
an adhesive dispensing head;
said adhesive dispensing head being adapted to apply two continuous streams of adhesive on the flexible strip overlapping edge before it passes between said sealing means.

35. Apparatus according to claim 34 in which said adhesive dispensing head is mounted for applying said streams of adhesive onto the flexible strip while it is on said guide plate.

36. Apparatus according to claim 35 in which said adhesive dispensing head and guide plate are adjustably mounted to accommodate larger diameter mandrels.

37. Apparatus according to claim 7 in which said drive means for rotatably driving said mandrel comprises;
a pulley wheel means mounted on said base;
a pulley belt mounted on said mandrel;
said mandrel support means adapted to move said mandrel to bring said pulley belt into engagement with said pulley wheel;
a motor for driving said pulley wheel means.

38. Apparatus according to claim 37 in which said pulley belt is mounted circumferentially on the outside of said mandrel.

39. Apparatus according to claim 38 in which said mandrel support means comprises;
a bearing adjustably mounted on said base for supporting said mandrel.

40. Apparatus according to claim 39 in which said adjustably mounted bearing includes;
a track mounted on said base;
said bearing being mounted on said track for traverse movement;
a worm screw passing through said bearing;
crank means attached to said worm screw whereby the position of said bearing on said track may be adjusted by turning said crank.

41. Apparatus according to claim 40 in which said mandrel includes;
a centrally located shaft;
said shaft adapted to engage said bearing to provide a cantilevered support for said bearing.

42. Apparatus according to claims 37 or 41 in which said wire feed means includes;
a plurality of wire feed rollers;
drive means for driving said wire feed rollers.

43. Apparatus according to claim 42 in which said wire feed roller drive means includes;
gear means attached to said wire feed rollers;
connecting means connecting said gear means to the motor for driving said pulley wheel means whereby the wire feed rollers and pulley wheel means are simultaneously and synchronously driven.

44. Apparatus according to claim 43 in which said wire feed rollers have opposing rollers forming at least one bite through which said wire will pass; spring loading means for spring loading the rollers forming said bite whereby variations in the wire are accommodated.

45. Apparatus according to claim 44 in which said spring loading means comprises;
a pair of rollers on a first frame means;
a pair of rollers on a second frame means in opposition to the pair of rollers on said first frame means;
said second frame means being movably secured by a plurality spring means whereby the bite formed by said pairs of rollers may vary according to the spring force; and
spring force adjusting means for adjusting the force of each of said plurality of springs individually.

46. Apparatus according to claim 45 in which said spring force adjustment means comprises;
a pair of threaded rods attached to said first frame passing through and extending beyond said second frame;
a nut threaded on each of said rods; and
a spring slideably encircling each rod compressed between said nut and said second frame whereby tightening of said nut compresses and increases the force applied by each of said springs individually.

47. Apparatus according to claim 46 in which said sealing means includes;
adhesive dispensing means for applying adhesive to the overlapping edge of said flexible strip means to seal said overlapping edges with said sealing means.

48. Apparatus according to claim 47 include;
an adhesive dispensing head;
said adhesive dispensing head adapted to apply two continuous streams of adhesive on the flexible strip overlapping edge before it passes between said sealing means.

49. Apparatus according to claim 48 in which;
said adhesive dispensing head is mounted for applying said streams of adhesive onto the flexible strip while it is on said guide plate.

50. Apparatus according to claim 49 in which;
said adhesive dispensing head and smoothing plate are adjustably mounted to be adjusted to accommodate larger diameter mandrels.

51. Apparatus according to claim 50 in which said adhesive is a hot melt adhesive.

52. Apparatus according to claim 51 in which said adhesive dispensing means includes;
a hot melt adhesive hopper;
a pump for supply of hot melt adhesive to said adhesive dispensing head;
adhesive pump drive means for driving said pump.

53. Apparatus according to claim 52 in which said adhesive pump drive means comprises;

pump gear means;

linking means linking said pump gear means to said motor for driving said mandrel pulley wheel means whereby said pulley wheel means, said wire feed rollers and said adhesive pump means are driven simultaneously and synchronously.

54. Apparatus according to claim 53 including;

flow adjusting means for adjusting the flow of adhesive from said hopper to said adhesive dispensing head.

55. Apparatus according to claim 54 including;

variable speed means for varying the speed of said motor for accommodating the feed rate of wire, flexible material and adhesive for different diameter mandrels to produce different diameter duct.

56. A flexible duct forming apparatus comprising;

a rotatable mandrel;

a support bearing for supporting said rotatable mandrel;

drive means for driving said rotatable mandrel;

a helical ring surrounding said rotatable mandrel;

wire supply means;

wire deforming means for deforming said wire to produce a predetermined coil diameter;

wire guide means on said helical ring forming a substantially fixed helical path of constant pitch and diameter for guiding and holding said wire on said substantially fixed helical path from said wire deforming means onto said mandrel;

flexible strip supply means;

flexible strip feeding means for feeding said flexible strip from said supply means onto said mandrel in a continuous helical overlapping pattern to enclose said wire;

sealing means for sealing the overlapping portions of said flexible strip to encapsulate said wire.

57. Apparatus according to claim 56 in which said bearing is adjustably mounted for adjustment to accommodate different size interchangeable mandrels.

58. Apparatus according to claim 57 wherein said adjustment means comprises;

a rectangular base plate;

a diagonal slot in said base plate;

said bearing being mounted for traverse movement in said diagonal slot whereby the axis of rotation of said mandrel can be adjusted along said diagonal slot.

59. Apparatus according to claim 58 wherein said bearing is mounted on a threaded adjustment screw parallel to said diagonal slot for adjusting the position of said bearing along said slot.

60. Apparatus according to claim 59 including a crank on said adjustment screw for manually adjusting the position of said bearing along said diagonal slot.

61. Apparatus according to claim 56 wherein said rotatable mandrel comprises a circular cylinder having an axial shaft for engaging said bearing.

62. Apparatus according to claim 61 wherein the cylindrical surface of said mandrel has a stepped relief to facilitate removal of completed flexible duct.

63. Apparatus according to claim 62 wherein said stepped relief in said mandrel is beyond at least one complete revolution of said wire.

64. Apparatus according to claim 58 wherein said helical ring is attached to a plate; said plate including means for removably mounting said helical ring on said base plate.

65. Apparatus according to claim 64 wherein said base plate has a predetermined bolt hole pattern adapted to accommodate different size helical ring mounting plates whereby different size helical rings may be easily interchanged.

66. Apparatus according to claim 65 wherein said base plate includes a plurality of hole mounting patterns for mounting different size interchangeable helical rings to match different size mandrels.

67. Apparatus according to claim 56 including;

a plurality of grooved rollers mounted on said helical plate; and a guide tube for guiding said wire into the groove in said rollers.

68. Apparatus according to claim 61 wherein said grooved rollers are adjustably mounted on said helical ring whereby the guiding force on said wire may be adjusted.

69. Apparatus according to claim 62 wherein there are at least approximately four guide rollers spaced around said helical ring.

70. Apparatus according to claim 69 wherein said helical ring covers a continuous area of approximately 360 degrees.

71. Apparatus according to claims 56 or 70 wherein said flexible strip feeding means comprises;

a guide plate means;

guide roller means for guiding said strip onto said mandrel whereby each strip overlaps the preceding strip a predetermined amount.

72. Apparatus according to claim 56 wherein said sealing means comprises adhesive applying means for applying an adhesive to the overlapping portion of said flexible strip material.

73. Apparatus according to claim 72 wherein said adhesive applying means comprises;

an adhesive melting pot;

a pair of adhesive dispensing nozzles positioned to apply adhesive in two continuous strips along the portion of the flexible strip material which will overlap.

74. Apparatus according to claim 73 including means for adjusting the position and spacing of said adhesive dispensing nozzles.

75. Apparatus according to claim 74 wherein said adjusting means comprises;

a shaft;

said adhesive dispensing nozzle being mounted for rotational and vertical movement on said shaft.

76. Apparatus according to claim 72 wherein said sealing means comprises a roller press for pressing the overlapping portions of the flexible strip to effect a seal.

77. Apparatus according to claim 76 wherein said roller press comprises a grooved roller means spanning the overlapping portions of the flexible strip with the wire tracking the groove in said grooved roller.

78. Apparatus according to claim 77 wherein said grooved roller means comprises;

a pair of rollers;

a belt having a groove rotatably mounted on said rollers.

* * * * *